Jan. 1, 1946.　　　　D. E. GRAY　　　　2,391,963
BOTTLE MACHINE
Filed Feb. 16, 1942　　　9 Sheets-Sheet 1

INVENTOR.
DAVID E. GRAY
BY F. H. Knight
ATTORNEY

Jan. 1, 1946.   D. E. GRAY   2,391,963
BOTTLE MACHINE
Filed Feb. 16, 1942   9 Sheets-Sheet 3

INVENTOR.
DAVID E. GRAY
BY
ATTORNEY

Jan. 1, 1946.  D. E. GRAY  2,391,963
BOTTLE MACHINE
Filed Feb. 16, 1942  9 Sheets-Sheet 4

INVENTOR.
DAVID E. GRAY
BY F. H. Knight
ATTORNEYS.

Patented Jan. 1, 1946

2,391,963

UNITED STATES PATENT OFFICE 2,391,963

BOTTLE MACHINE

David E. Gray, Corning, N. Y., assignor to Corning Glass Works, Corning, N. Y., a corporation of New York Application February 16, 1942, Serial No. 431,148

25 Claims. (Cl. 49—5)

The present invention relates to machines for manufacturing hollow articles of glassware, and particularly to automatic machines in which charges of molten glass are received in blank or parison molds and, after being formed therein, are transferred to finishing molds in which the parisons are blown to the form of the finished article.

A prime object of the invention is a high output machine.

Another object is a machine having a high parison mold efficiency.

Other objects and features of the invention will become apparent from a further perusal of the specification and reference to the accompanying drawings illustrating the preferred embodiment of the invention.

Fig. 17 is an enlarged plan view of fragments of the mold sidewall conveyors during their operative run;

Fig. 17a is a view taken on line 17a—17a of Fig. 17;

Fig. 17b is a view taken on line 17b—17b of Fig. 17a;

Fig. 17c is a view taken on line 17c—17c of Fig. 17a;

Fig. 18 is an enlarged plan view of one of the mold sidewall conveyor tracks and fragments of the conveyor; and Fig. 18a is a view taken on line 18a—18a of Fig. 18.

Figure 1:
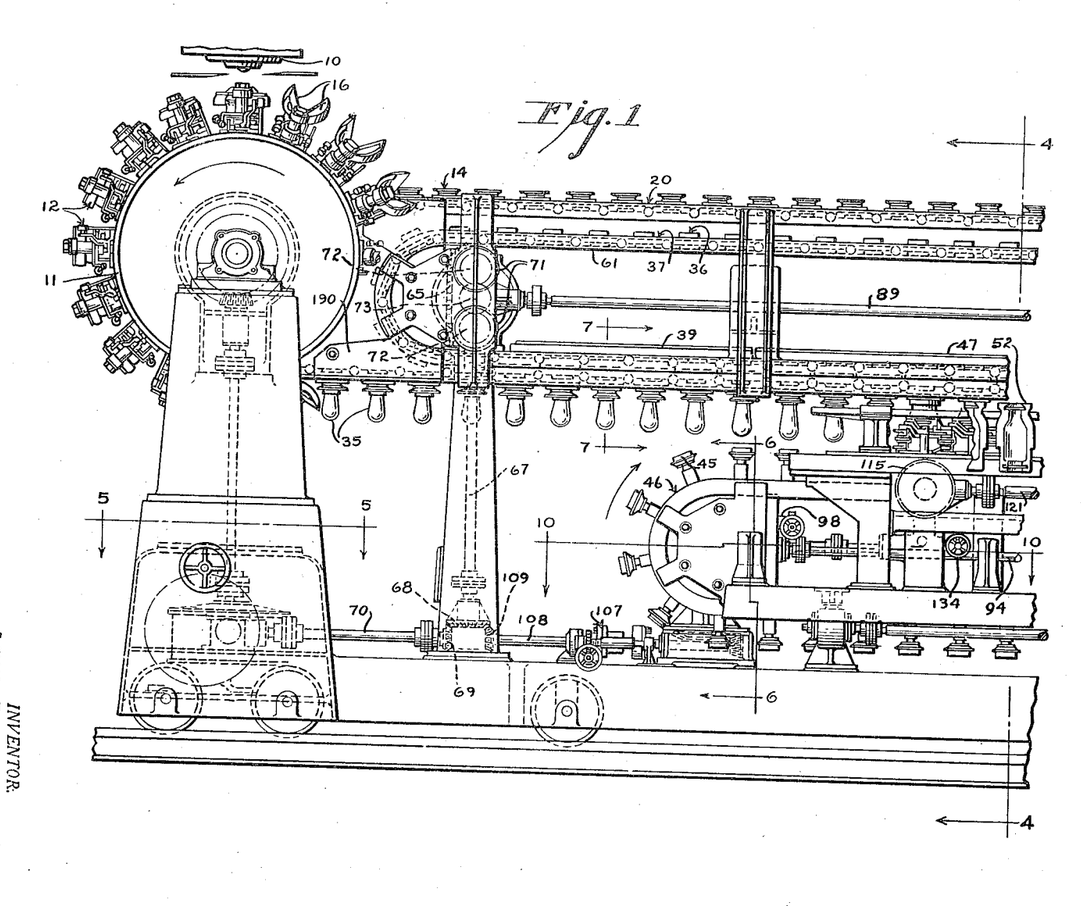
Figs. 1, 2, and 3, when arranged side by side, show a side elevation of the machine.
Figure 2:
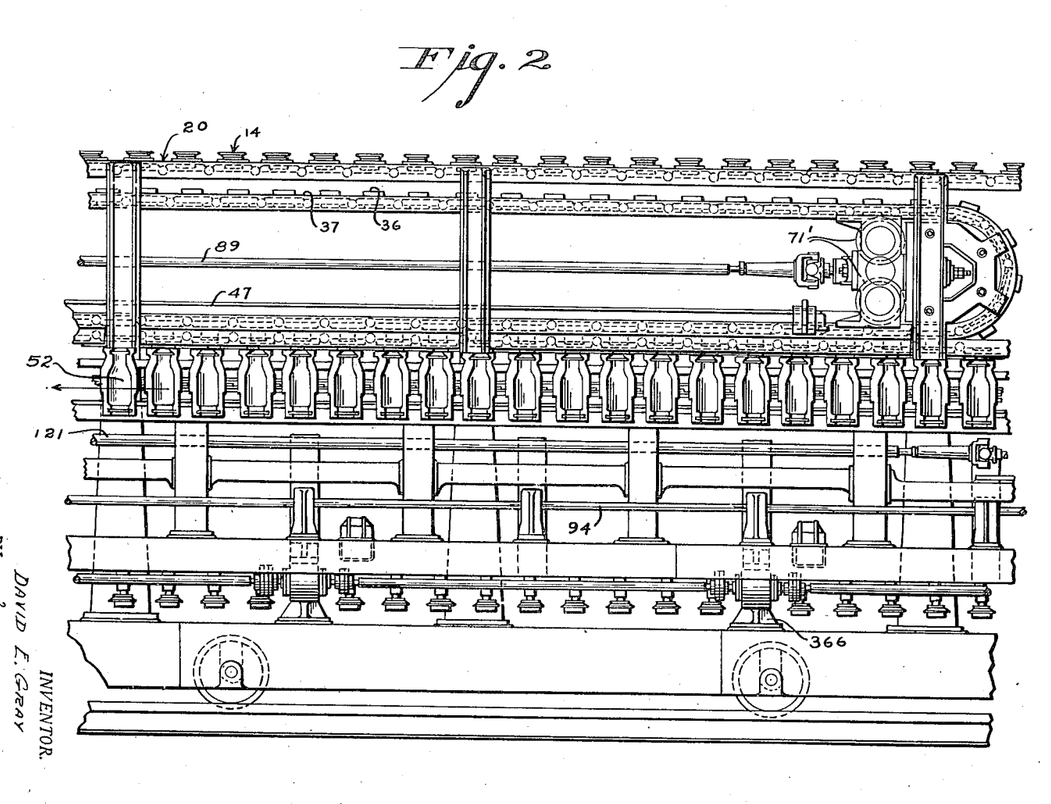
Figures 3, 3A:
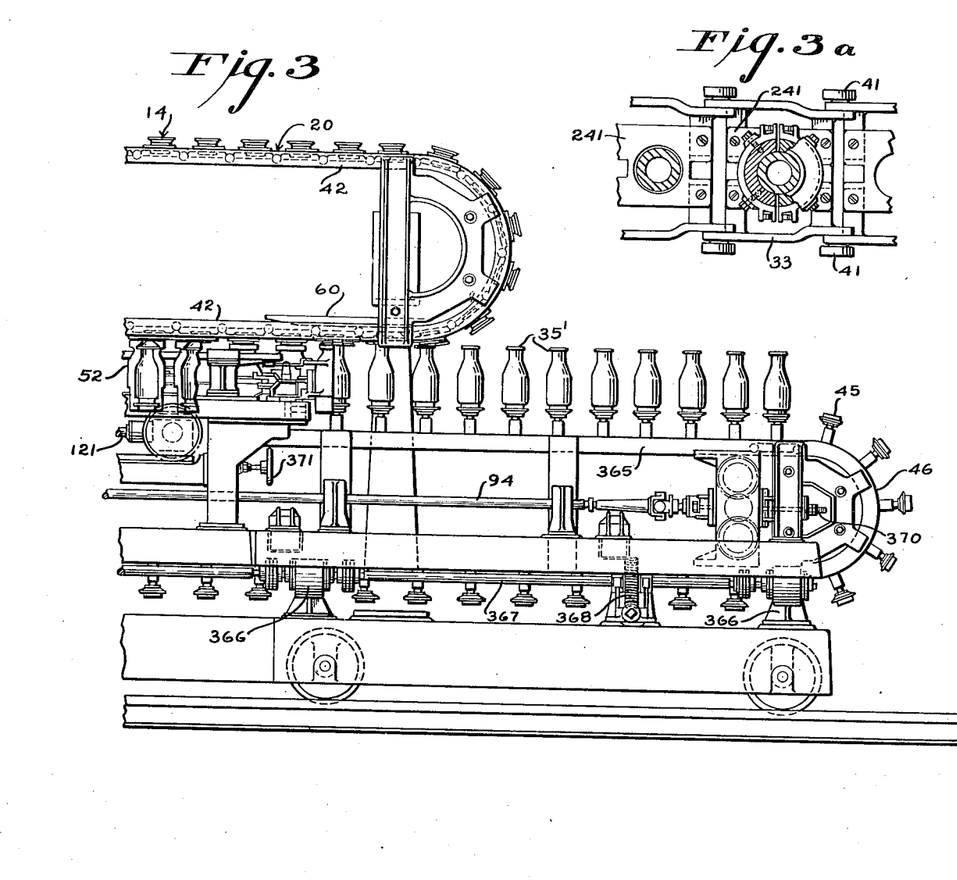
Fig. 3a is a plan view, partly in section, of a fragment of the neck ring conveyor of the machine.

A brief description of the machine and of its operation will first be given after which its construction and operation will be gone into in greater detail. As depicted in Figs. 1, 2, and 3, the machine embodies a drum 11 having parison mold assemblies 12 arranged in a row about its periphery midway between its ends, as will be evident from an inspection of Fig. 4, with cooperative neck mold plungers 13 (Fig. 12) arranged within the drum and adapted to be projected through neck rings 14 into the interior of the respective parison mold assemblies. The neck rings 14 are supported on an endless conveyor 20 having upper and lower horizontal paths of travel and which partly encompasses the periphery of the drum 11 at one end of these paths, successively bringing the neck rings 14 into register with the neck forming plungers 13. While a neck ring 14 is associated with the drum 11 the sidewalls 15 (Fig. 12) of a parison mold assembly 12 close about the neck ring, a charge of glass is introduced into the mold from a feeder 10 (Fig. 1), top members 16 of the mold close over and around the mold sidewalls, and plunger 13 is projected through the neck ring into the mold to form a hollow parison 35 (Fig. 1) having the configuration of the neck ring and mold. The plunger 13 and the respective mold parts 15 and 16 are restored to their initial positions just before the path of travel of the neck ring 14 diverges from that of the drum 11, so that the parison 35 is freely suspended from the neck ring as it starts over its lower horizontal path of travel. In traveling over this latter path the top of the neck ring 14 is brought into register with a blowhead assembly 36 of a group thereof carried by an endless conveyor 37. The blowhead 36 is provided with a shoe 38 (Fig. 7) cooperative with the under side of an air box 39 from which puffs of air are supplied to the parison 35 through the neck ring 14. After a relatively short distance of travel a finishing mold bottom 45, of a group thereof supported by an endless conveyor 46, is brought under the parison 35 and moves in unison therewith. Rather closely following association of a mold bottom 45 with the parison 35, the parison and mold bottom enter converging paths of endless conveyors 50 and 51 (Fig. 4) supporting the mold sidewalls or mold halves 52 of a group of finishing mold assemblies. A pair of these sidewalls close about the mold bottom 45 and the neck ring 14 above it to enclose the parison for blowing to final form. During its subsequent advance the parison 35 receives blowing air from a blowbox 47 with which the blowhead 36 has become associated in lieu of the puff box 39, forcing the parison 35 to the contour of the finishing mold sidewalls 52, after which the path of travel of the blowhead diverts through a vertical arc and commences an upper horizontal run toward the drum 11. A distance beyond the point of diversion of the path of travel of the blowheads 36 the paths of travel of the finishing mold sidewalls 52 divert laterally from that of the mold bottom 45. As soon as the sidewalls have moved clear of a finished article 35', the neck ring 14, which is split but held closed under spring pressure, encounters a cam 60 (Fig. 3) which separates the neck ring sufficiently to free the article therefrom. The article 35' accordingly remains on the mold bottom 45 as the neck ring 14 travels through a vertical arc and proceeds in its upper horizontal run toward the drum 11. The finished article 35' may be picked up from the mold bottom 45 in any desired manner prior to the downward movement of the bottom 45 through a vertical arc preceding its travel towards the loading end of the machine.

*Mold carrying drum*

The parison mold carrying drum 11 (Figs. 1, 4, 12, 13, 13a and 13b) is composed of miscellaneous conveniently manufactured and assembled parts and includes a hub assembly provided at its ends with axles 17—17' carried in bearings 18—18'. The axle 17 passes through its bearing and carries a bevel gear 21 by means of which the drum is continuously rotated. The drive extends through a bevel pinion 22, shaft 23, bevel gear 24, bevel pinion 25, shaft 26 (Fig. 5), coupling 27, shaft 29, coupling 30, and a gear reduction unit 31 receiving its drive directly from an associated motor 32.

*Neck ring conveyor*

Figure 4:
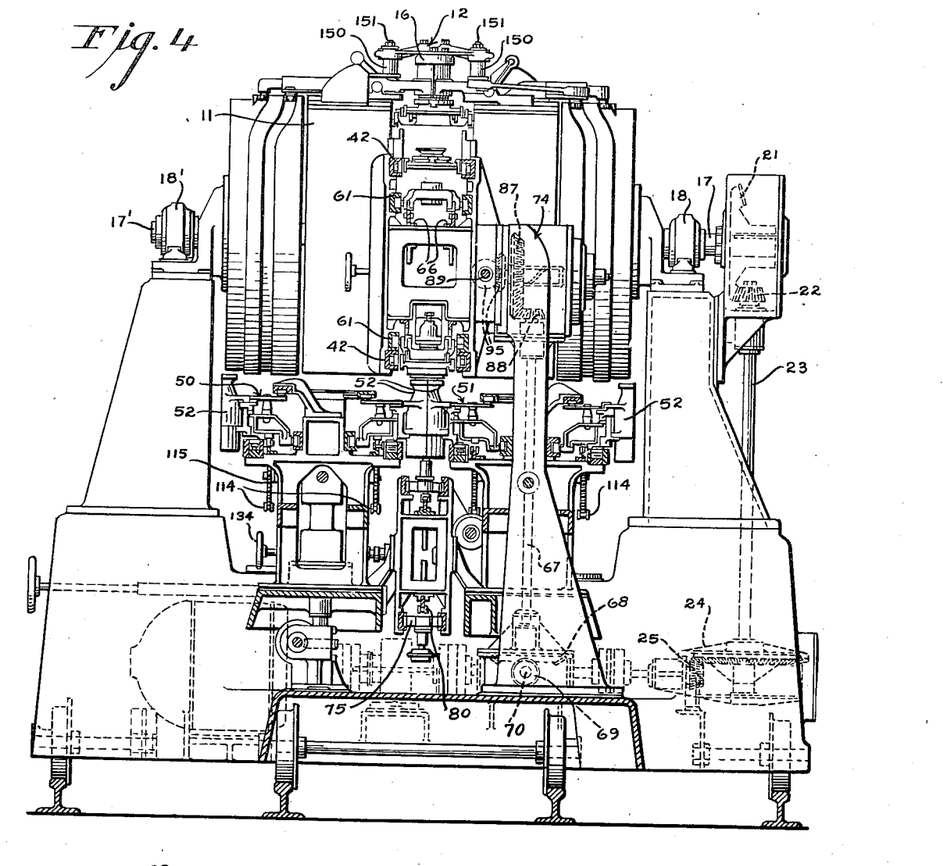
Fig. 4 is a sectional elevation taken on line 4—4 of Fig. 1.
Figure 5:
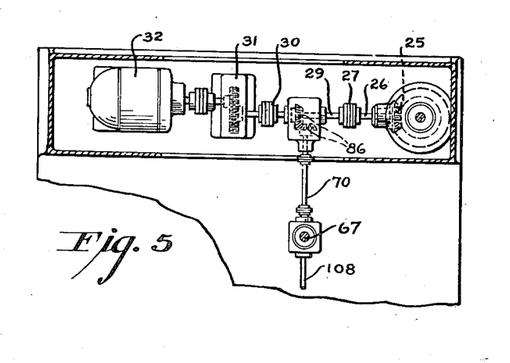
Fig. 5 is a sectional plan view on line 5—5 of Fig. 1.

The neck ring conveyor 20 (Fig. 3a) is composed of links 33 pivotally connected to one another to form an endless chain, each link being equipped with rollers 41 which travel over a track 42, best shown in Fig. 4. The conveyor is driven by the drum 11 through the association of rollers 41 (Fig. 12) which mesh with individually mounted lugs 40 on drum 11 similar to a chain engaging a sprocket wheel.

*Blowhead conveyor*

Figures 7, 9:
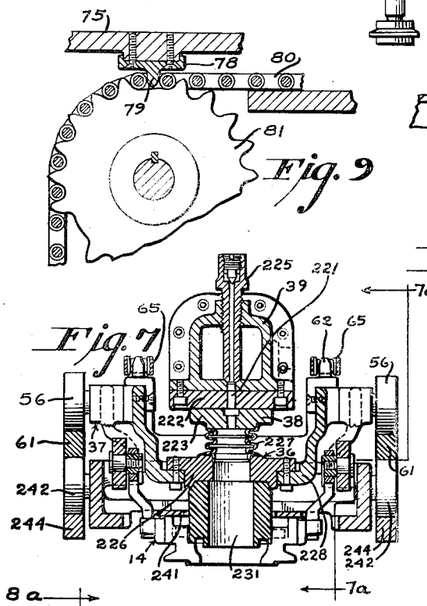
Fig. 7 is a view taken on line 7—7 of Fig. 1.
Fig. 9 is an enlarged detail illustrating the mold bottom conveyor drive arrangement.
Figure 7A:
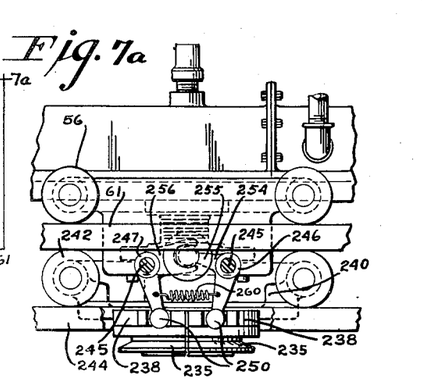
Fig. 7a is a side elevational view of equipment appearing in Fig. 7.
Figure 8:
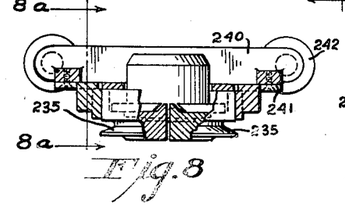
Fig. 8 is a side elevational view, partly in section, of a fragment of the neck ring conveyor assembly.
Figure 8A:
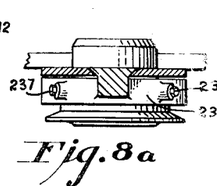
Fig. 8a is a view taken on line 8a—8a of Fig. 8.

The blowhead conveyor 37 (Figs. 1 and 2) is composed of links 228 (Figs. 7 and 7a) pivotally connected to one another to form an endless chain equipped with rollers 56. An endless track 61 provides the path for these rollers. The conveyor 37 at the feed end of the machine is driven by two similar chains 65 (Figs. 1 and 7) connected in driving relation with the conveyor by teeth 62 secured to the links 228 near their lateral edges and brought into engagement with the chains 65 during their horizontal runs. The chains 65 during their upper horizontal runs are supported on suitable tracks 66 (Fig. 4). At the ends of their horizontal runs chains 65 pass about sprocket wheels 71 and 71¹ (Figs. 1 and 2) similar to a sprocket wheel 81 (Fig. 9). The wheels 71 are driven by associated gears 72 in mesh with a gear 73 coupled, by means of bevel gears 87 and 88 to a drive shaft 67 (Figs. 1, 4 and 5), via a synchronizing unit 74. The shaft 67 at its lower end is provided with a bevel gear 68 which is in mesh with a bevel drive pinion 69 carried on one end of a shaft 70 driven by shaft 29 (Fig. 5) through the medium of a bevel gear 86. By means of bevel gears 95 (Fig. 4) a shaft 89, and gears similar to 72 and 73 the sprocket wheels 71¹ also transmit driving force to the chains 65.

*Mold bottom conveyor*

Figure 6:
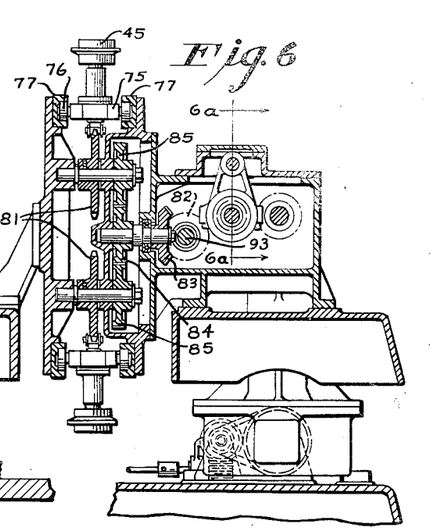
Fig. 6 is a sectional view taken on line 6—6 of Fig. 1.
Figure 6A:
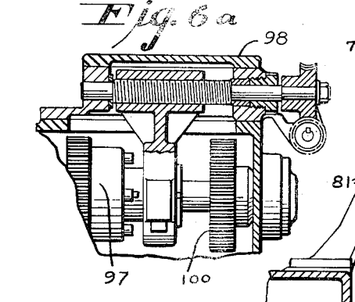
Fig. 6a is a view taken on line 6a—6a of Fig. 6.
Figures 10, 11, 11A:
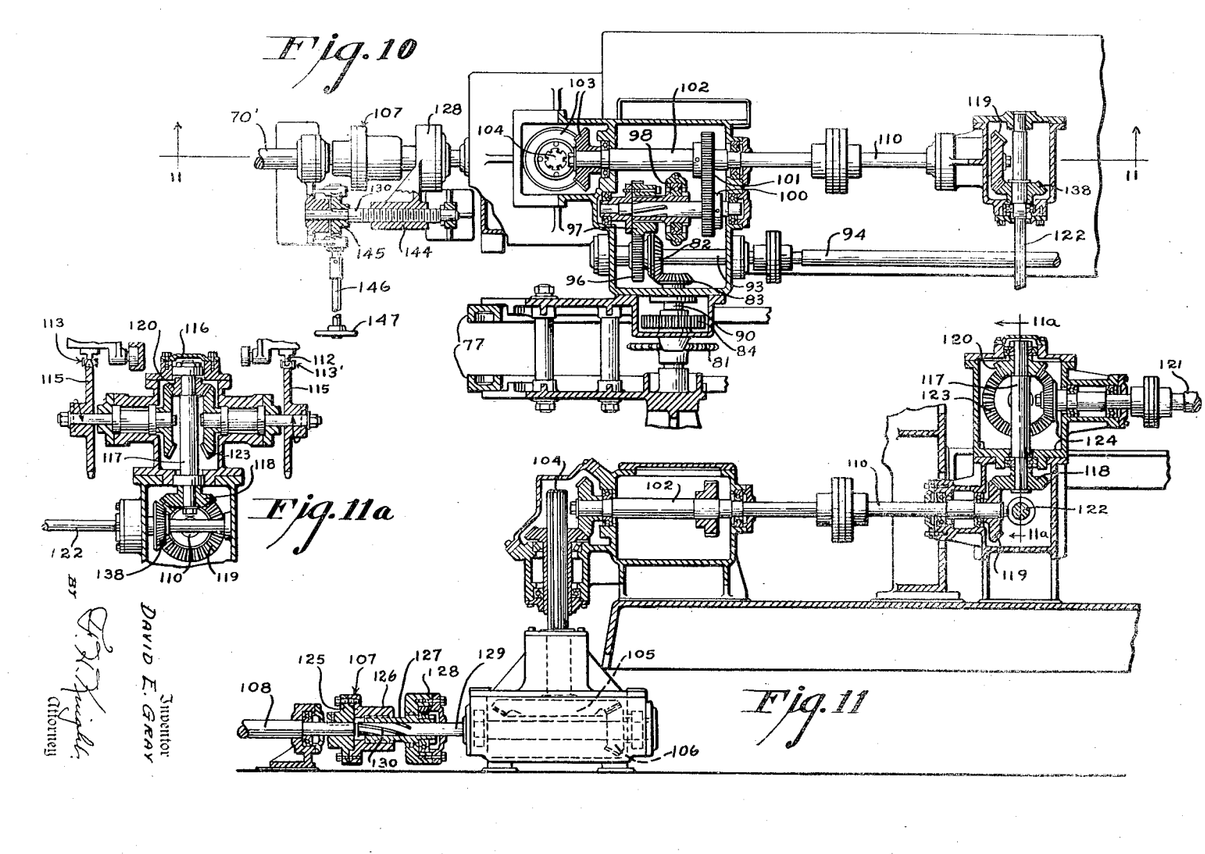
Fig. 10 is a sectional plan view taken on line 10—10 of Fig. 1.
Fig. 11 is a sectional elevation of the apparatus of Fig. 10 taken on line 11—11 of Fig. 10 and of adjoining parts not illustrated in Fig. 10.
Fig. 11a is a sectional elevation taken on line 11a—11a of Fig. 11.

The mold bottom conveyor 46 is composed of a series of links 75 (Fig. 6) having supporting rollers 76 which travel in endless channel tracks 77. The underside of each link 75 has secured thereto a member 78 (Fig. 9) having a drive tooth 79 adapted to engage a link of a drive chain 80 throughout each horizontal run of the conveyor, as illustrated in Fig. 4. Chain 80 is driven at each end of its horizontal run by sprocket wheels 81 (Fig. 9) rotated by suitable gears, those at the left-hand end of the run being shown in Fig. 6 as comprising bevel gears 82 and 83 and a spur gear 84 adapted to mesh with gears 85 carried by shafts supporting the sprocket wheels 81. The gear 82 is carried and driven by shaft 90 which, as shown in Fig. 10, is driven by a bevel pinion 92 carried by a shaft 93 coupled to a mold bottom drive shaft 94 and driven through a spur gear 96, a spur gear 97 of a synchronizing unit 98, spur gears 100 and 101, a counter shaft 102, bevel pinions 103 and a vertical drive shaft 104 (Fig. 11). The shaft 104 receives its drive from motor 32 (Fig. 5) through gear reduction unit 31, coupling 30, bevel gears 86, shaft 70, pinion 69, bevel gear 68, pinion 109, shaft 108, synchronizing mechanism 107, and a shaft 129 with attached pinion 106 in mesh with bevel gear 105 carried by shaft 104. The mold bottom drive shaft 94 extends to the opposite end of the horizontal run of the mold bottom conveyor and is arranged to drive the mold bottom sprocket wheels at that end of the conveyor. The latter drive arrangement is similar to that already described.

*Mold half conveyors*

Figure 14:
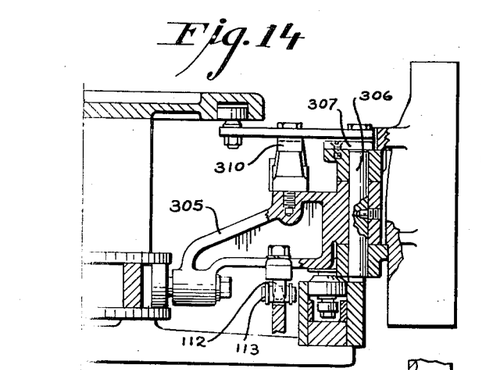
Fig. 14 is an enlarged fragment, partly in section, showing details of a mold sidewall conveyor mechanism.
Figure 15:
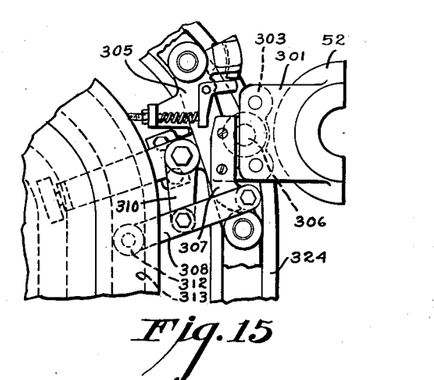
Fig. 15 is an enlarged plan view of equipment appearing in Fig. 14.

Each of the finishing mold half conveyors has a drive arrangement similar to those employed in driving the mold bottoms. Since conveyors 51 and 52 are alike and driven in substantially the same manner, only conveyor 51 will be described. The conveyor 51 is composed of a series of mold half supporting links 305 (Figs. 14, 15 and 17) each provided on its under side with a tooth 112 for engagement with the links of one or the other of two drive chains 113, each driven by a pair of sprocket wheels 115 (Figs. 1, 4, 11a). Chains 113 during their upper runs are supported in a manner similar to chain 80 (Fig. 9) so as to maintain the teeth 112 in engagement therewith. In Fig. 11a are illustrated the chain sprocket wheels 115 associated with a pair of chains 113. Rotation of sprocket wheels 115 in opposite directions is effected through a bevel gear 123 and a pinion 120 of a differential drive assembly 116 having a shaft 117 driven by a bevel pinion 118 in mesh with a bevel gear 119 carried by a shaft 110 which is coupled directly to shaft 102 (Fig. 10) and which in a manner already explained also drives the mold bottom conveyor. A bevel gear 123 of the differential drive assembly 116 is in mesh with a pinion 124 carried by a shaft 121. This latter shaft extends to the end of the machine shown in Fig. 3 where it terminates in a differential assembly similar to that shown in Fig. 11a. The drive for the chains of the other conveyor is similar to the one described and is driven off a cross shaft 122 carrying a bevel pinion 138 in mesh with a bevel gear 119 on shaft 110 (Figs. 11 and 11a) and has included in it a synchronizing unit similar to 107 (Fig. 11) but only the hand wheel 134 of which is shown. The chains 113 and the similar ones of the mold half conveyor 52 are also driven by sprocket wheels (not shown) at the delivery end of the machine.

Parison mold assemblies

As will be apparent from an inspection of Fig. 1 in the construction shown there are sixteen parison mold assemblies 12 arranged in a circle about the periphery of drum 11. The operating mechanisms of these mold assemblies, all of which are alike, are arranged on the right and left of the respective mold assemblies as best depicted in Fig. 4 and are operated in sequence as the drum rotates through the medium of drum cams arranged adjacent opposite ends of the drum. A pressing plunger 13 (Fig. 12) is provided for each mold assembly and is operated by mechanisms within the drum and drum cams, each alternate mechanism being arranged within the left end of the drum and the adjacent drum cam and the remaining similar mechanisms being arranged within the right end of the drum. Within the drum and drum cams provision is made for supplying air to the molds.

Figure 12:
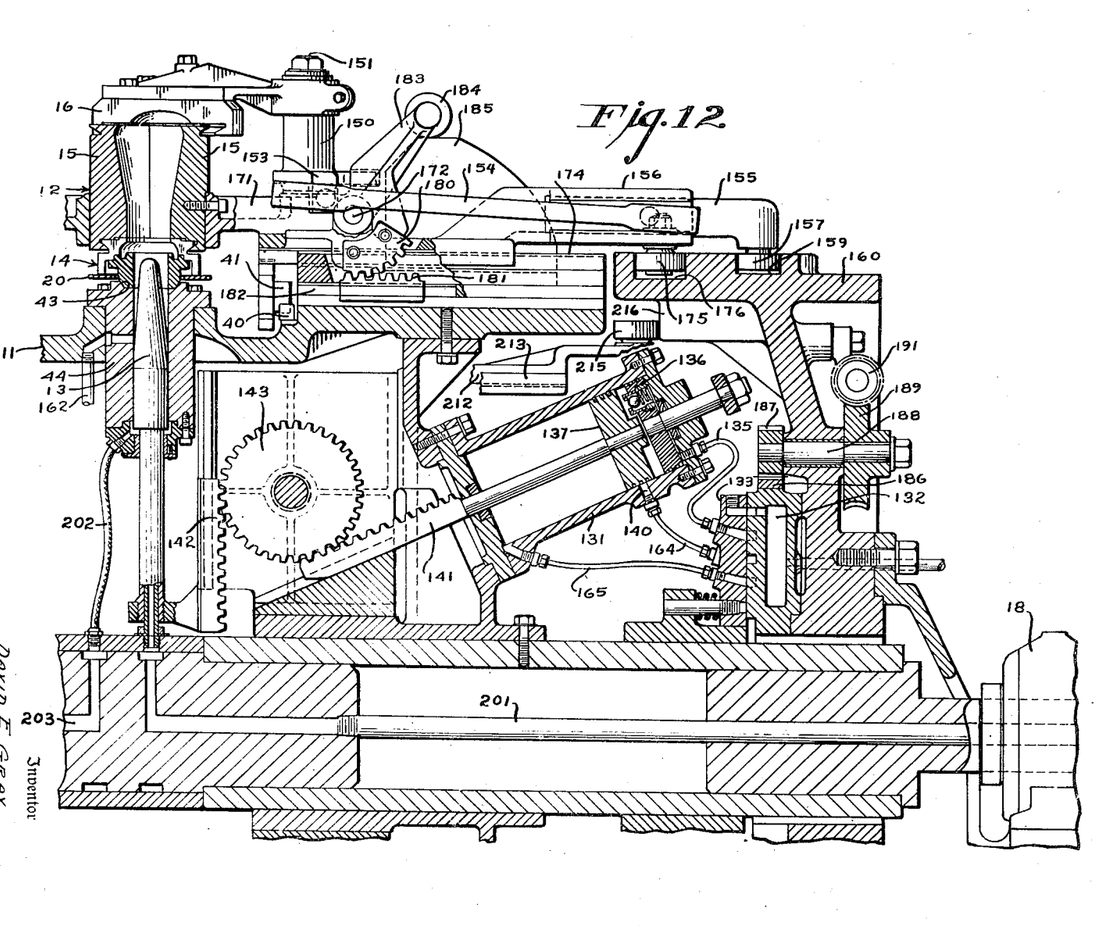
Fig. 12 is an enlarged sectional elevation illustrating mechanism within the parison driving drum.
Figures 13, 13A, 13B:
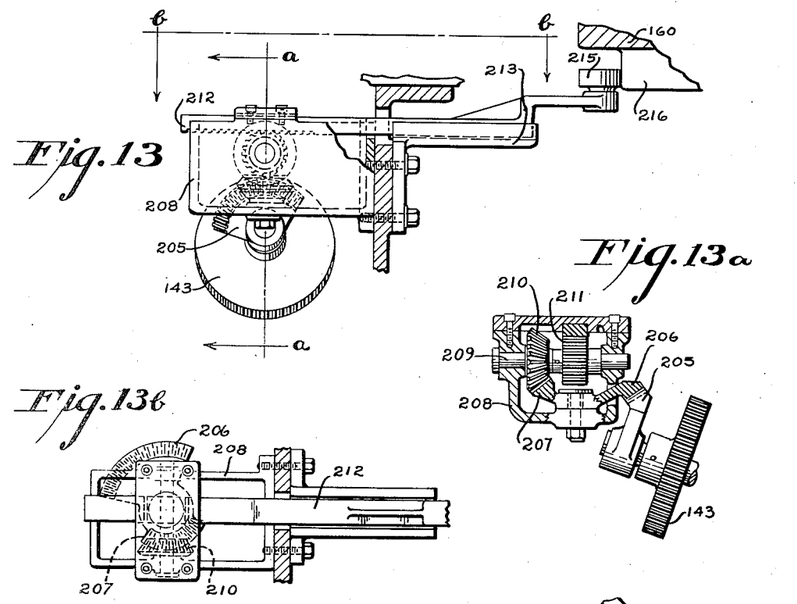
Fig. 13 is a view of equipment within the drum and only partly shown in Fig. 12.
Fig. 13a is a view taken on line 13a—13a of Fig. 13.
Fig. 13b is a view taken on line 13b—13b of Fig. 13.

Various mechanisms associated with drum 11 and by which the forming of a parison is effected can best be explained by reference to Fig. 12 which illustrates a parison mold assembly 12 whose sidewalls 15 are closed about a neck ring 14 but whose top members 16 are still in their open position, and with the forming plunger 13 in fully retracted position. This is the position of these parts just before the mold assembly 12 passes under the feeder 10 (Fig. 1). As the mold assembly 12 advances under the feeder 10 the plunger 13 is projected through the neck ring 14 a short distance. This is accomplished by a pneumatic power unit 131 which receievs operating air from a reservoir 132 through a slide valve 133 just before the drum 11 brings a parison mold assembly into register with the feeder 10. The air thus supplied passes through a tube 135 into the upper end of the power unit 131 causing a primary piston 136 to drive the associated secondary piston 137 downward a short distance, through the medium of racks 141 and 142 and a pinion 143, advancing the plunger through the neck ring 14 a short distance. The piston 137 is thus moved sufficiently to uncover a port 140 through which the unit is later supplied with air to further advance the plunger 13 into the parison mold.

As a mold assembly 12 passes under the feeder 10 a charge of glass is delivered to the mold in the customary manner, it being understood that in accordance with common practice, operation of the feeder is suitably synchronized with the movement of the parison molds.

The closing of mold members 16 about the sidewalls 15 is effected immediately after a charge is received. As can be seen from Figs. 4 and 12, members 16 are clamped to sleeves 150 which are arranged to swing on posts 151 to the right and left respectively of the axial center of the mold. Each sleeve 150 has a bell crank 153 formed on its lower end and linked by means of a ball and socket to one end of an operating lever 154, the other end of which is similarly coupled to a cam arm 155 slidably carried in a mold sidewall operation arm 156 and carrying a roller 157 adapted to travel in a cam groove 159 of a drum cam 160. The contour of this groove and the similar one of the drum cam adjacent the other end of drum 11 are such that members 16 are closed about sidewalls 15 immediately after a charge has entered the mold cavity.

It is desirable actually to start the further upward movement of plunger 13 in time for it to meet the falling charge and to retard its rate of fall and to accomplish this, an upward blast of air may, if desired, be applied to the charge while members 16 are closing. This blast of air is supplied from reservoir 132 through a suitable port (not shown) in a slide valve 133 and a tube 162 in communication with the bore of sleeve 44 surrounding plunger 13. The supply of air is not, however, necessary to the successful operation of the machine.

At the instant the members 16 are closed, or very slightly before this occurs, air is supplied from reservoir 132 through a tube 164 to the pneumatic unit 131 causing the piston 137 thereof to drive the plunger 13 up into the mold 12 thereby forming a parison 35 to the configuration of the mold and its neck ring 14. As the neck ring 14 approaches the point of tangency of its path of travel with respect to that of the parison mold assembly, the port relationship between slide 133 and the reservoir 132 becomes such that air is supplied to the lower end of the pneumatic unit 131 via a tube 165 and the air supply lines to the upper parts of this unit are vented to atmosphere, so that the piston 137 is driven to the upper end of the cylinder thereby also restoring piston 136 and the plunger 13 to their initial positions.

Also before the mold assembly 12 reaches the point where its path diverges from that of neck ring 14, the contour of drum grooves 159 are such that members 16 are caused to swing clear of the sidewall members 15. Each sidewall 15 is supported on one end of a bell crank 171 pivoted at 172 on the associated operating arm 156 which is slidably arranged on a track 174 forming part of the drum assembly 11. The other end of arm 156 carries a roller 175 adapted to travel in a groove 176 of the drum cam 160, and is of such contour as is required to impart desired lateral and swinging movement to the sidewall 15. The sidewall supporting bell crank 171 has attached thereto a sector gear 180 in mesh with a rack 181 arranged for limited sliding movement on drum sector 182 and also has an arm 183 whose free end carries a roller 184 adapted to travel over a cam plate 185 secured to the drum assembly 11. The arrangement is such that following the opening of top members 16 the contour of groove 176 is such as to move each arm 171 in a direction to separate its sidewall from the other. During the initial stage of this movement the bell crank 171, rack 181 and sidewall 15 move laterally with operating arm 156. Before such lateral movement is completed, however, rack 181 reaches the end of its path of travel so that during the further lateral movement of arm 156 the sector 180 is forced quickly to rotate the bracket about its pivot 172 to a position in which the path of travel of the sidewall 15 is clear of the ends of the neck ring track supporting structure 190 (Fig. 1) adjacent the drum 11. The cam plate 185 cooperates with the roller 184 carried by bellcrank 171 to prevent the uncontrolled swinging of the sidewall 15 toward its open position while in a lower position on the rotating drum assembly 11. After being advanced around and past the upper end of the neck ring track supporting structure 190 and before passing under feeder 10, the sidewall 15 is again brought into cooperative relation with a neck ring 14 by restoration of the above described mechanism under control of cam groove 175.

A water supply pipe 201 (Fig. 12) passes through the axle of drum 11 and communicates with the interior of the plunger 13 to cool the same; water flows from the plunger through a hose 202 into a passage 203 in the drum hub and in communication with a drain pipe (not shown) similar to pipe 201.

A secondary plunger operating mechanism is provided for mechanically restoring the plunger 13 to its retracted position to prevent its interference with the passage of a neck ring off the drum should the pneumatic unit for some reason fail to retract the plunger. In this secondary operating mechanism there is a sector gear 205 (Figs. 13 and 13a) carried on the shaft of the plunger operating pinion 143, in mesh with a sector gear 206 pivoted in a frame 208 and supported within the drum assembly 11. Another sector gear 207 integral with sector gear 206 is in mesh with a bevel pinion 210 carried by a shaft 209 passing through frame 208. The shaft 209 is provided with a pinion 211 adapted to be rotated by a rack 212 slidably supported in a guide 213 and equipped with a roller 215 engaging a cam surface 216 of drum cam 160. Should the pneumatic unit fail to function the cam surface 216 becomes effective, as rotation of the drum continues, through the medium of this secondary drive mechanism to turn the plunger operating pinion 143 as required to move the plunger 13 to its fully retracted position clear of interference with the neck ring 14.

Puff and blow box assemblies

The puff box 39 (Figs. 1 and 7) has a plurality of bottom outlets 221 passing through a shoe plate 222 through which puffs of air are supplied to an associated blowhead assembly 36 in much the fashion that air is supplied to the blowheads of the well-known Gray et al. Patent 1,790,397. A valve assembly 225 is provided for each aperture, and may be adjusted to control the amount of air supplied to the blowheads to cut off the air supply thereto entirely, or may be adjusted to vent the blowhead to atmosphere. The blow box 47 (Figs. 2 and 3) is of similar construction to the puff box, except that the setting of its air supply valves and the air pressure thereof usually differ from that of the puff box.

Blowhead assemblies

Each blowhead assembly comprises a blowhead shoe 223 adapted to slide along the shoe plate 222 and is coupled to a blowhead tip 226 by a bellows 227. The blowhead tip 226 is supported on a link 228 of the blowhead conveyor chain and is provided with rollers 56 carried by the pins which couple the respective links to one another and travel on the track rails 61. As will be apparent from Fig. 7 the blowhead tip 226 is adapted to fit neatly over a tubular portion 231 of a neck ring assembly 14 while traveling therewith.

Neck ring assemblies and operation

The lower end of the tubular portion 231 of a neck ring assembly 14 fits into laterally separable neck ring halves 235 which are held by cap screws 237 in neck ring half holders 238 slidably secured to a conveyor link 33 (Figs. 3a and 7a), by a plate 241 secured to the under side of the link. Each link 33 is provided with supporting rollers 242 which carry the neck ring conveyor over track rails 244. Each conveyor link 33 is provided with two stub shafts 245 upon which are pivoted bell cranks 246 and 247 each having a depending arm 250 projected into a channel provided in the neck ring half holders 238. The upper arm 254 of bell crank 246 is provided with a stub shaft carrying a roller 255 and is also partly surrounded by the free end of the upper arm 256 of bell crank 247. A spring 260 bridges the bell crank arms 250 and normally holds the neck ring halves together except during such time that the roller 255 is engaged by the cam track 60 (Fig. 3). The position of track 60 is such that it forces the roller 255 downward thereby causing the bell cranks 246 and 247 to swing their arms away from one another against the tension of spring 260 to clear the neck ring halves 235 from engagement with a finished article 351 just before and for a short time after their path of travel diverts from that of the mold bottoms.

Finishing mold sidewall assemblies

Figure 16:
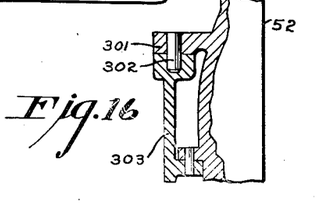
Fig. 16 is an elevational view, partly in section, illustrating a mold sidewall mounting arrangement.

Each finishing mold sidewall 52 (Figs. 14, 15 and 16) is provided with ears 301 having depending pins 302 for readily attaching and detaching it from a suitable support 303 apertured to receive such pins. The support 303 is pivoted to the associated conveyor link 305 by a pin 306 and is turned about such pin by an arm 307 secured to support 303 and pivoted to one end of a lever 308. The lever 308 is in turn pivoted intermediate its ends on a support 310 carried by link 305. The other end of lever 308 carries a roller 312 traveling in a channel or track 313 having such contour that when the complementary mold halves 52 approach one another at the beginning of an operative run as well as when they start to leave one another at the end of such run, they are turned sufficiently in the proper direction about pins 306 to clear one another.

Provision is made to lock the complementary mold sidewalls 52 together while the ware is being blown to final form so as to positively prevent the sidewalls from being separated by the blowing pressure. The sidewalls are locked by a latch assembly arranged to bridge the mold sidewall conveyors 50 and 51 at the junctions of their links 305 and 333. Each lock assembly comprises a latch 315 (Figs. 17 and 17a) and a catch 316. The latch 315 is supported intermediate its ends on a pin 318 which passes through a slotted aperture of the latch and is in turn supported by plates 319 secured to a latch assembly support 320. The support 320 is keyed to a pin 321 which pivotally joins adjacent links 305. The latch assembly support 320 in addition is provided with a latch stop 322, a supporting roller 323 which travels on a track 324 and with lugs 351—354 cooperative with pads 355 and 356 formed on the links 305. The functions of these parts will subsequently be brought out.

Arranged about pin 321, immediately below support 320, is the leading end 305' of a link 305. Arranged immediately above support 320 is a latch operating sector 325 which is fixed to the leading end of link 305 and serves as a second pivoted support therefor. The latch operating sector 325 has a channel 326 formed therein and whose upper inner surface is slanted (Fig. 17b) and its lower inner surface milled to accommodate a wedge shaped slide 327 having its top surface parallel to the slanted surface of channel 326. The end 315' of latch 315 projects into the channel 326 and has ball bearings set into its upper and lower surfaces. A bell crank 330 carried by sector 325 and under the influence of a spring 331 urges the wedge 327 in the proper direction to engage the lower ball bearing and thus force the end 315' of lever 315 upward until the upper ball bearing engages the slanted surface of channel 326.

The raising of the latch 315 is effected by turning of the link 305 and with it the latch operating sector 325 relative to the latch support 320 as the link 305 advances over a curved section of track 324. The lowering of the latch 315 is effected by the return of the link operating sector 325 to its initial position relative to the latch support 320 as the link 305 leaves a curved section of the track.

The catch 316 of each locking assembly is mounted on a latch support 320' in the same manner as the latch 326 is mounted on support 320. A catch operating sector 325' is employed and differs from sector 325 to the extent that both the lower and upper surfaces of its channel 326' are integral with the sector, no part corresponding to wedge 327 being required for the catch assembly as will become evident hereinafter. Also the direction of slant of the channel 326' is reversed with respect to that of channel 326, and the sector 325' instead of being fixed to the leading end of the link 305 across from the link to which its co-operative latch sector 325 is secured, is fixed to the following end of the link 333 immediately in advance thereof. From the foregoing it will be understood that the operation of the catch 316 always precedes that of the latch 315.

Figures 17, 17A, 17B, 17C, 18, 18A:
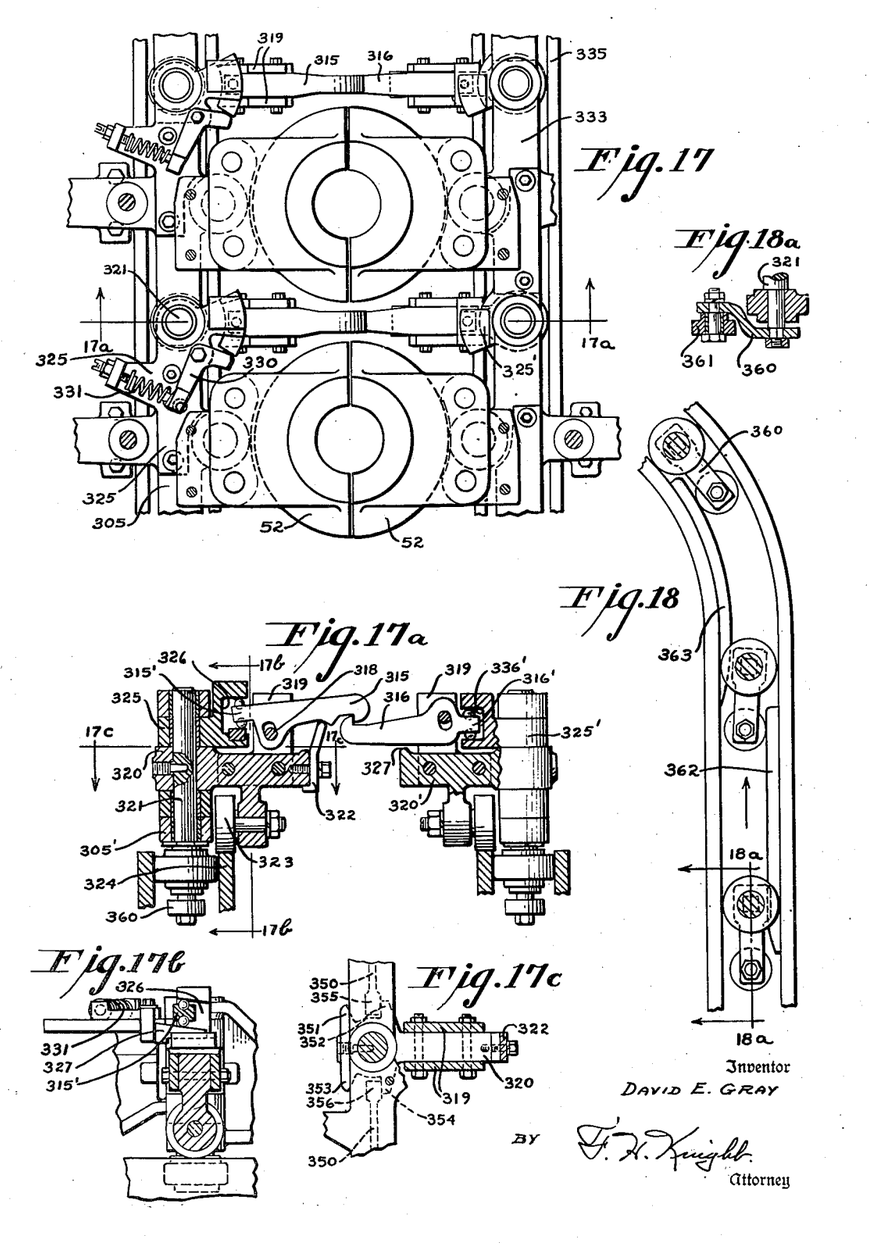

To explain the operation more fully attention is directed to Figs. 17 and 17a wherein latches 315 and catches 316 are shown in locking relation so that the next function to be performed is the lowering of a catch 316 to disengage it from its latch 315. This occurs as the forward end of link 333 swings clockwise upon encountering the curved portion of track 335. The sector 325', being fixed to link 333 accordingly is also turned clockwise and brings the high end of its channel 326' into association with the end 316' of catch 316 thereby forcing the catch to fulcrum about a raised portion 337 of the catch support 320' sufficiently to clear the catch from latch 315 before the oppositely disposed link 305 has arrived at the curved portion of its track 324. Upon the passage of link 305 over the curved portions of its track 324 sector 325 also turns and raises latch 315. As already mentioned, the latch 315 and catch 316 are operated each time their supporting links enter or leave curved sections of their tracks. The latch 315 is accordingly again lowered and raised before starting another operative run and similarly the catch 315 is again raised and lowered before starting another operative run. Since the link 333 is the first link of a locking assembly to leave the curved end of its track to begin a new operative run sector 326' is operated to raise catch 316 just before the sector 326 is operated to lower latch 315 into locking relation therewith, as shown by Figs. 17 and 17a. If it be assumed that the lower inclined surface of wedge 327 is rigid as is the lower inclined surface of channel 326' of sector 325' and for one reason or another a catch 316 is in a position to obstruct the lowering of latch 315, breakage or undue strain on some part of the equipment would occur under these circumstances. Since, however, the wedge 327 can slide against the tension of spring 331 if the above abnormal condition occurs, the wedge 327 will remain stationary with respect to the lever 315 while the sector turns with its supporting link 305 in the usual manner. The offending catch 316 in many instances will an instant later move toward its latch 315 sufficiently to enable the spring 331 through the medium of bell crank 330 to force the latch down over the catch before the blowing of the ware within the mold has begun so that a minimum of loss of ware results from such abnormal operation.

It will be noted from an inspection of Fig. 17c that links 305 have web members 350 equipped with pads 355 and 356 arranged between lugs 351, 352 and between lugs 353 and 354 respectively formed on the latch support 320. The pads 355 and 356 during the straight runs of links 305 engage lugs 352 and 354 and thus serve to hold the support 320 at right angles to the adjacent links so as to positively align a latch 315 with its catch 316. During the initial travel of a link 305 over a curved portion of track 324, pad 355 leaves stop 352 and moves toward stop 351. To prevent uncontrolled turning movement of the latch support 320 while a pad 355 is intermediate the lugs 351—352, the pivot pin 321 has fixed thereto a bracket 360 (Fig. 18a) carrying an auxiliary guide roller 361 and cooperative cam track sections 362 and 363 (Fig. 18). The cam tracks 362 and 363 are so arranged with respect to the track 324 that as a curved section thereof is encountered and pad 355 starts moving away from lug 352, roller 361 encounters cam track 362 and thus continues to hold the support 320 against counterclockwise movement. As pad 355 is about to engage lug 351 and pad 356 is about to leave stop 354, the roller 361 runs off cam track 362 and encounters cam track 363 which functions to prevent uncontrolled clockwise movement of the support 320 until such time that the pad 356 prevents this by engagement with lug 353. As will be readily understood, similar equipment (not shown) to that above described also prevents uncontrolled turning movements of the catch supports 325'.

Adjustment features

It will well be appreciated that the successful operation of a machine embodying a plurality of conveyor driven units, such as herein disclosed, requires facilities for shifting the several conveyors about their paths of travel with respect to one another so that the parts carried by such conveyors can properly co-operate. This is accomplished in the instant structure by the previously mentioned synchronizing units 74, 107 and 98 and a comparable one only the hand wheel 134 of which is shown. By means of hand wheel 134, the mold halves of conveyor 51 can be brought into proper position to co-operate with the mold halves of conveyor 50. By means of unit 74 the blowhead conveyor 37 can be shifted as required to bring blowheads 36 into axial alignment with the neck rings 14. By means of unit 107 the mold halves of both conveyors can be shifted as required properly to co-operate with the neck rings. Similarly by means of unit 98 the mold bottom conveyor 46 can be shifted as required to bring the mold bottoms into axial alignment with the neck rings before closure of the mold halves about the neck ring and mold bottoms respectively.

The principle of operation of all of the synchronizing units is the same and accordingly a detailed description of the best illustrated unit, namely, unit 107 (Figs. 10 and 11), will suffice. The unit 107 includes a flange member 125 keyed to drive shaft 108 and has bolted thereto a housing 126 telescoped over and splined to a sleeve 127 of a housing 128. Sleeve 127 is keyed to the driven shaft 129 by spiral splines 130 so that by shifting housing 128 endwise relative to shaft 129 the rotary position of this shaft is shifted relative to the drive shaft 108. The shifting is accomplished by a screw 130 threaded into a bracket 144 integral with housing 128. The screw 130 carries a worm wheel 145 in mesh with a worm (not shown) carried by a shaft 146 equipped with a suitable hand wheel 147. By turning hand wheel 147, the equipment driven by shaft 129, namely the mold bottom and mold half conveyors, may therefore be shifted in unison to modify the positions of the mold bottoms and sidewalls relative to those of the neck rings.

In order to enable the machine to employ different heights of mold halves, the support 365 for the mold bottom conveyor is arranged on jack screws 366 adapted to be operated by a shaft 367 turned by means of a worm wheel 368 (Fig. 3).

Slack in the mold bottom conveyor 46 may be regulated by nuts carried by a screw 370. Similar adjustment of the slack in conveyors 50 and 51 is effected by a hand wheel 371.

Modification of the time of operation of the plunger operating power unit 131 (Fig. 12) may also be accomplished by shifting of the air box 132 with respect to the co-operating slide valve 133. To do this box 132 is equipped with a rack 186 in mesh with a pinion 187 carried by a shaft 188 provided with a worm wheel 189 which is manually turned by a worm 191 as required to attain the desired adjustment.

While I have described and illustrated in detail a machine which is the preferred embodiment of my invention, it is appreciated that equivalent mechanical functions can be performed with structures of somewhat different design and accordingly my invention is to be limited solely by the scope of the appended claims.

What is claimed is:

1. In a glass working machine, a circular member, a plurality of parison molds arranged equidistant from one another about the periphery of said member and each comprising separable side and end members, a group of neck molds common to said parison molds, means for temporarily associating neck molds of said group with certain of said parison molds, means for rotating said circular member, means operated by the rotation of the circular member to move said side members into and out of cooperative relation with one another and with the associated neck molds, and other means operated by the rotation of said circular member to move said end members into and out of cooperative relation with said side members and with one another.

2. In a glass forming machine, a drum having a plurality of glass forming assemblies arranged in a circular row about its periphery, pressing plungers for projection into said molds having operating mechanism arranged within said drum, an endless conveyor wrapped around said drum, neck rings for said molds arranged on said conveyor, means for turning said drum to drive said conveyer and thus successively temporarily associate said neck rings with said pressing plungers, and means operated during the turning of said drum to associate said glass forming assemblies with neck rings which have become associated with said plungers.

3. In a glass forming machine a plurality of parison mold assemblies, a plurality of neck ring assemblies, means for successively associating the neck ring assemblies with said parison mold assemblies, a smaller plurality of blowhead assemblies than there are neck ring assemblies, means for temporarily associating said blowhead assemblies with said neck ring assemblies after their association with said parison molds, means for supplying air to said blowheads, a plurality of finishing mold assemblies having separately supported sidewalls and bottoms, means for bringing the mold bottoms into cooperative relation with neck rings having blowheads associated therewith, means for bringing the sidewalls of said mold assemblies successively into cooperative relation with the neck rings having mold bottoms associated therewith and for subsequently moving the sidewalls clear thereof, and means for thereafter opening the neck rings.

4. In a glass forming apparatus, a divided mold assembly which includes component side and bottom members, a separate support for each member, means providing separate closed paths of travel for the respective supports which bring such members in cooperative relation with one another during their travel through a selected portion of their respective paths, and means for moving said supports about their respective paths.

5. In a glass forming apparatus a divided mold assembly which includes component side and bottom members, a separate support for each member, means providing separate closed paths of travel for the respective supports which bring such members in cooperative relation with one another during their travel through a selected portion of their respective paths, a glass parison support, means providing a path of travel for said support such that a parison held thereby becomes surrounded by said members as they travel through said selected portion of their respective paths, means for moving said parison support over the path provided therefor, and means for supplying air to the parison while enclosed within said mold members.

6. In a glass forming apparatus a divided mold assembly which includes component side and bottom members, means providing a separate closed path of travel for each of said members, said paths varying in contour as required periodically to bring said members into cooperative relation, a parison support, means providing a closed path of travel therefor which will periodically deliver a parison of glass to said mold members as they are being brought into cooperative relation, means for moving said mold members and parison support about their respective paths, and means for supplying air to a parison within said mold assembly.

7. In a glass working machine, a pair of complementary mold units arranged in cooperative relation, oppositely disposed conveyor chain links supporting said units, means for supplying blowing air to an article surrounded by said units, and temporary bridges extending from the ends of one link to the ends of the other to prevent their separation by the pressure exerted on the mold units by the blowing air.

8. In a glass working apparatus, an endless conveyor chain, a mold unit associated with each link of said chain, a second endless conveyer chain, a mold unit associated with each link of said second conveyor chain, means providing similar paths of travel for said chains so arranged with respect to one another that the mold units of the respective chains are successively brought together in cooperative relation during their travel over a selected portion of their paths of travel, and means bridging the links of the chains at the junctions of their corresponding links as they travel over such selected portion of their paths.

9. In a glass forming apparatus, a divided mold assembly which includes component side members, a separate support for each member, means providing separate closed paths of travel for the respective supports which bring said members in cooperative relation with one another during their travel along a selected portion of their respective paths, means for moving said supports along their respective paths, a catch mechanism associated with each of certain of said supports, a latch mechanism associated with each of the remaining of said supports, and means operated solely by the movements of said supports for said mechanisms into locking relation after the associated members are brought into cooperative relation with another and freeing them from locking relation just before the cooperative relation of the associated members terminates.

10. In a glass working machine, a circular member, a plurality of separable mold assemblies equally spaced about the periphery of said member, a drum cam arranged at each end of said circular member in coaxial relation therewith, and linkages between said drum cams and said mold assemblies whereby the mold assemblies are brought into and out of cooperative relation consequent to a relative turning movement between said circular member and drum cams.

11. In a glass working apparatus, a drum having apertures therethrough, a plurality of neck rings, means for temporarily arranging said neck rings over said apertures in succession, mold assemblies adapted to be closed about neck rings arranged over said apertures, plungers arranged within said drum for advance into mold assemblies closed about said neck rings, and means for advancing and retracting said plungers.

12. In a glass working machine, a drum having a row of molds arranged about its periphery and having apertures through its wall through which access may be had to the interior of said molds, pressing plungers for the most part within said drum projected through said apertures, means for rotating said drum, means for temporarily closing each mold through a selected arc of the movement of said drum, and means under control of said drum for projecting said plungers into and out of the mold cavities in the meantime.

13. In a glass working machine, a cylindrical member rotatable about a fixed axis, a mold assembly including separable side and end wall parts, separately pivoted supports for each of said parts, a drum cam at each end of said cylindrical member having a pair of cam grooves therein, operating links for said parts connected with their supports and each link having a roller thereon adapted to travel in one of said grooves, said grooves being of such contour as to actuate said links to open and close the respective parts in a desired order as the cylindrical member is rotated, and means for rotating said member.

14. In a glass working machine a drum mounted for rotation about a horizontal axis and having apertures through its wall in a row normal to the axis of the drum, a sleeve passing through each aperture and containing a pressing plunger, neck rings associated with certain of said sleeves where they project through the perimeter of the drum, mold assemblies arranged on said drum, means for rotating said drum, means operated during such rotation to close said molds about said neck rings, and means under control of the drum for advancing a pressing plunger into the confines of a mold assembly following its closure about a neck ring.

15. In a mold assembly, a neck ring, a divided sidewall adapted to be clasped about said neck ring, a divided endwall adapted to be clasped about an end of said sidewall when the same is closed about said neck ring, a plunger projected into said neck ring and adapted to be advanced into the area enclosed by said side and end walls, and a moving support for said side and end walls and for said plunger under control of which the movement of said side and end walls and said plunger are effected.

16. In a glass working machine, a cylindrical member rotatable about a horizontal axis, a mold assembly arranged on the periphery of said cylindrical member and comprising separable side and end members, a cam arranged at each end of said cylindrical member, linkages between the respective parts of said mold assembly and said cams for moving such parts into and out of cooperative relation as said cylindrical member is being rotated, and auxiliary means for preventing movement of certain of such parts under the influence of gravity.

17. In a glass working machine, a plurality of glass working units each comprising a link of a chain formed of said units and each link having a driving tooth associated therewith, a sprocket wheel having teeth omitted therefrom at intervals corresponding to the spaces between the teeth of said units, a drive chain in mesh with said sprocket wheel always cooperative with teeth of certain of said units whereby the same may be driven by rotation of said sprocket wheel, and means providing a path of movement for said units which successively brings the tooth of each unit into a link of said drive chain occupying a space on said sprocket wheel from which a tooth has been omitted.

18. In a glass working machine a neck ring which includes a tubular portion with separable parts surrounding the tubular portion, a spring and cooperative elements for normally holding said parts tightly clasped about said tubular portion, a device for moving said elements against the tension of said spring to free said parts from said tubular portion, and means for effecting relative movement between said elements and device for the purpose set forth.

19. In a glass working machine, a chain composed of a plurality of links each having a neck ring assembly associated therewith, each assembly including a tubular portion with neck ring halves together surrounding said portion, means including a pair of bell cranks and a spring for normally holding said neck ring halves in co-operative relation, means providing a path of travel for said chain, means for moving said chain about its path, and means arranged along a selected portion of said path for actuating said bell cranks to temporarily move and hold the neck ring halves out of cooperative relation with their associated tubular portion.

20. In a glass working machine a circular member rotatable about a horizontal axis, a plurality of separable parison mold assemblies equally spaced about the periphery of said member, a pressing plunger within said member for each mold assembly, a plurality of neck rings having a path of travel such that the neck rings are successively brought temporarily into register with said plungers about a portion of said rotatable member, means for enclosing a portion of the mold assembly associated with each such plunger about the registering neck ring, means for closing the remainder of the mold assembly about that portion thereof enclosing the said neck ring, and means for moving the plunger through the said neck ring into the associated mold and for withdrawing it before the path of travel of the neck rings diverges from the circular rotatable member.

21. In a glass working machine, a neck ring which includes a tubular portion with separable parts surrounding said portion, a spring and co-operative elements for normally holding said pairs tightly clasped about said tubular portion, a pressing plunger, means for temporarily associating said neck ring with said plunger, means for introducing said plunger temporarily into said neck ring, a blowhead, means for temporarily associating said neck ring with said blowhead after association of the neck ring with said plunger, and a device for moving said neck ring elements against the tension of said spring to free said parts from said tubular portion.

22. In a glass working machine, a circular member mounted for rotation about a horizontal axis, a plurality of parison molds arranged equidistant from one another about the periphery of said member each comprising separable side and end members and each mold, when closed, having its axial center normal to the axis of said circular member, means operated by the rotation of the circular member to move said side members into co-operative relation as they reach a vertical position over the axis of said circular member, means to feed charges of glass to molds in vertical position over the axis of said circular member, and means operated by the rotation of said circular member to move said end members into co-operative relation with said closed side members as they leave their vertical position.

23. In a glass working machine a circular conveyor drive member, means for rotating said member, a plurality of separable parison mold assemblies equally spaced about the periphery of said member, a pressing plunger associated with said member for each mold assembly, an endless conveyor wrapped around said member and driven thereby, said conveyor having neck rings thereon successively brought temporarily into register with the plungers of said mold assemblies, means for closing a portion of said mold assembly about a neck ring in register with a plunger, means for closing the remainder of the mold assembly about that portion thereof enclosing the said neck ring, and means for moving the plunger through the said neck ring into the associated mold and for withdrawing it.

24. In a glass working machine, an endless conveyor having a plurality of neck rings arranged thereon, means including a circular rotatable member providing upper and lower horizontal paths of travel for said conveyor, means for rotating said circular member, means associated with the said member for also driving said conveyor, and a plurality of glass forming assemblies carried by said circular member brought into register with those of the neck rings passing from one horizontal path of travel to the other such path.

25. In a glass forming machine, a plurality of neck ring assemblies, a smaller plurality of finishing mold bottom assemblies, means for at all times associating some of said finishing mold assemblies with some of said neck ring assemblies, a still smaller plurality of finishing mold wall pairs, means for at all times associating some of said finishing mold assemblies with those of said neck ring assemblies which are in association with mold bottoms, a further but still smaller plurality of blowhead assemblies, and means for at all times associating some of said blowhead assemblies in co-operative relation with those of the finishing wall pairs which are associated with mold bottoms and neck rings.

DAVID E. GRAY.